Nov. 9, 1965   C. F. CHUBB, JR   3,217,223
MOTOR CONTROL SYSTEM
Filed June 17, 1960   2 Sheets-Sheet 1
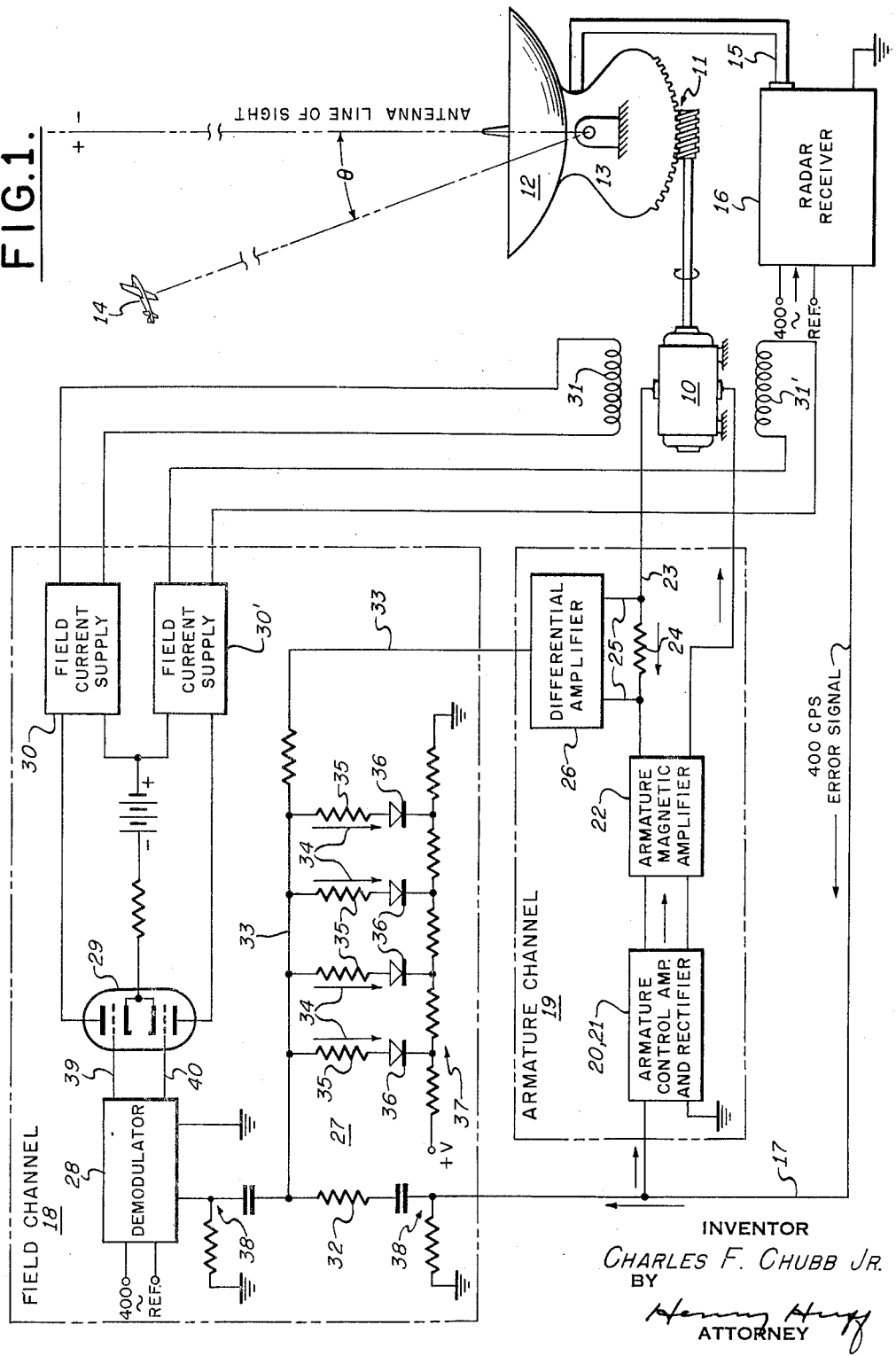
INVENTOR
CHARLES F. CHUBB JR.
BY
Henry Huff
ATTORNEY Nov. 9, 1965  C. F. CHUBB, JR  3,217,223
MOTOR CONTROL SYSTEM
Filed June 17, 1960  2 Sheets-Sheet 2

INVENTOR
CHARLES F. CHUBB JR.
BY
ATTORNEY

United States Patent Office 3,217,223
Patented Nov. 9, 1965

3,217,223
MOTOR CONTROL SYSTEM
Charles F. Chubb, Jr., Glen Head, N.Y., assignor to Sperry Rand Corporation, Great Neck, N.Y., a corporation of Delaware
Filed June 17, 1960, Ser. No. 36,926
10 Claims. (Cl. 318—432)

This invention relates to electronic control systems of the type used to regulate the output of direct current electric motors.

In servomechanism and related applications it is desired and often necessary to provide a means for controlling a direct current motor in such a manner that its torque is a linear function of the magnitude of an input control signal. It is known that linear torque control may be obtained by using the control signal to regulate current supplied to either the armature or a field winding of the motor, while current through the other windings is held constant. Armature control alone, however, suffers from the disadvantage of slow response, especially in the case of larger motors which require very large amounts of armature current with associated reactance type components. Field control alone, although permitting fast motor response as a result of the relatively small current involved, suffers from a rather restricted range of operation. This is due to field saturation at one extreme and the danger of excessive armature current at the other.

Further problems in the control of direct current motors occur when their direction of rotation is quickly changed. Upon reversal of the motor field flux, the armature shaft will continue to rotate under inertial influence. This results in generator action which produces additional armature current independently of the external armature current control. In the event that magnetic amplifiers or other saturable reactance devices are used to control armature current, this self-induced current increase may cause saturation of these devices whereupon a yet further uncontrolled increase in armature current will occur. This may cause damage to the armature windings and most certainly affects the linearity of the torque output.

Consequently, it is an object of this invention to provide an electronic motor control system which produces maximum torque response to changes in input signal over a greater range of operation than before possible.

It is a further object of this invention to provide a motor control system having a response characteristic which is independent of armature current and associated armature reactance type devices.

It is another object of this invention to provide a motor control system wherein the torque output is a linear function of the input signal.

It is a further object of the invention to provide a motor control system in which equal changes in input signal result in equal changes in torque throughout the entire range of operation.

It is a yet further object of this invention to provide a motor control system wherein armature current and torque linearity are unaffected by sudden reversals of rotation.

In brief, these objects are accomplished by using any error signal voltage that may occur as a control signal and by simultaneously applying the control signal to individual amplifier channels supplying current to the armature and field windings of the motor. The response of the armature channel to the change in control signal is detected and used degeneratively to control the gain of the field channel. The armature channel response may be detected by measuring the armature current or torque output of the motor. Thus, as the control signal increases, the current through the field windings, and consequently the field flux, will quickly follow, causing the torque to rise in proportion to the control signal. After the armature delay has been overcome, the armature current will begin to rise causing the torque to increase further. The detected current or torque then is used to decrease the field current by an amount that will keep the product of field and armature currents at a constant value. As a result the torque output remains linearly proportional to the error signal and the field flux is returned to a relatively low value.

Referring now to the figures:

FIG. 1 is a schematic representation of a preferred embodiment of the invention;

Figure 3:
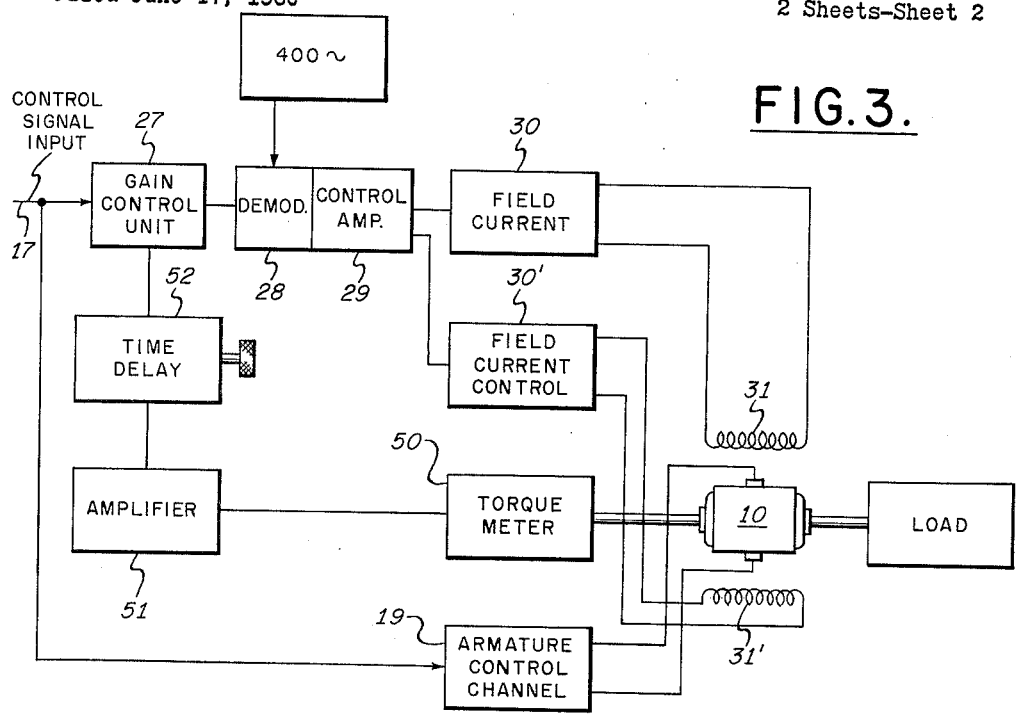
FIG. 3 is a schematic representation of an alternate embodiment of the invention.

A preferred embodiment of the present invention is shown in FIG. 1 as applied to a tracking radar system. Here a servomotor 10, through an armature shaft and a worm drive 11, causes an antenna 12 to pivot about a fixed point 13. Microwave signals from a distant target 14 are received by the antenna and transmitted via a waveguide means 15 to a radar receiver 16. The receiver extracts the information contained in the microwave signal and produces a 400-cycle-per-second error signal having a phase and amplitude proportional to the direction and magnitude, respectively, of the target deviation from the antenna line of sight. This error signal is used as a control signal and simultaneously applied via signal supply conductors 17 to a field control channel 18 and an armature control channel 19 which supply current to the various servomotor windings.

The armature control channel includes a control amplifier 20, a rectifier 21, a magnetic amplifier 22 and an armature circuit 23. In the absence of an error signal greater than a predetermined threshold level the armature control circuit maintains a constant armature current. This initial armature current is necessary to provide an instantaneous response in the region of zero torque output. Any error signal greater than this threshold level is raised to a usable value in the armature control amplifier and then rectified to produce a unidirectional armature control voltage. Thus, the armature channel is made responsive only to the magnitude of the error signal and its unidirectional excitation serves as a reference for obtaining desired direction of rotation through field control. The armature magnetic amplifier 22 includes saturable reactors which control the large amounts of current required in the armature winding. A series connected resistor 24 located in series with the armature winding, experience a voltage differential proportional to the instantaneous value of armature current. This voltage is applied by means of leads 25 to a differential amplifier 26 where a bias control voltage proportional to the magnitude of the armature current is produced and applied to the field control channel by means of a common conductor 33.

The field control channel includes a gain control device 27, a demodulator 28, a control amplifier 29 and individual field current supplies 30, 30' connected to individual field windings 31, 31' of the servomotor.

The gain control circuit comprises a resistor 32 and common conductor 33 serially connected to the field channel signal supply conductor 17. A number of parallel shunt paths 34 extend from the common conductor to ground. Each of these parallel paths includes a resistor 35 and a diode 36 biased by means of a voltage divider circuit 37 to conduct above a discrete voltage level. The resistances and the bias levels of the diodes are chosen so that the impedance of the circuit varies inversely with the applied bias. Capacitive-resistive filters 38 are located in the signal supply conductor on either side of the gain control circuit. These permit the 400 cycle error signal voltage to pass through the gain control circuit to the demodulator 28, while isolating both the radar receiver 16 and the demodulator from the high control voltages from the differential amplifier supplying the gain control control.

The error signal from the radar receiver is phase detected in the demodulator 28, and finds itself in the form of a voltage proportional to the magnitude of the error signal on one of two output leads 39, 40 from the demodulator. The control amplifier 29 comprises a double triode having grids excited by the respective output leads of the demodulator. Thus, the control amplifier will cause a bias current to flow in the appropriate field current supply means depending upon the phase of the error signal and to a degree depending upon its amplitude. The individual field winding excited from this field current supply produces a magnetic flux causing the armature shaft to rotate in a particular direction. Because of the unidirectional excitation of the armature, a magnetic flux induced in the other field winding will produce an opposite direction of rotation.

The operation of the device will now be discussed. As the target 14 moves with respect to the antenna line of sight, a change occurs in the modulation of the microwave signal which the antenna supplies to the radar receiver 16. This, in turn, results in a change in the magnitude and/or phase of the error signal which is applied simultaneously to the field and armature channels 18 and 19. The signal change is amplified in each of the channels and used to produce an excitation of the appropriate motor windings to a degree linearly proportional to its amplitude. This excitation of the motor windings results in a torque output which causes the antenna to pivot accordingly. For this application, as in most D.C. servomotor applications, it is desired that the torque output of the motor be linearly proportional to the magnitude of the error signal. Furthermore, it is desired that changes in torque output will follow changes in error signal with a minimum of delay.

Because of the relatively large current required in the armature circuit of the motor, and because of the inherent delays in the magnetic amplifiers supplying this current, the response of the armature channel is relatively slow and the armature current does not change before the lapse of a certain amount of time. Thus, the armature current is time delayed but remains an ultimately linear function of the control signal voltage. The field channel, on the other hand, controls relatively small currents and experiences a very short delay in exciting the one or the other of the field windings. Consequently, the value of the field flux is instantaneously a linear function of the control signal voltage.

It is to be noted that the value of output torque at any moment is proportional to the product of the values at that moment of the armature current and the field flux. Since the armature current is a time delayed but ultimately linear function of the control signal, while the field flux is an instantaneous and linear function of the control signal, it follows that the output torque will be an instantaneous and linear function of the input control signal and therefore the error signal if the gain of the field control channel at any time is divided by the value of the armature current at that time.

Although division may be accomplished in any of several known ways, it remains an inherently difficult process. Because of the nature of the division to be accomplished in this system, it has been found expedient to use an approximation method wherein the error signal in the field control channel is attenuated different amounts by varying the impedance of a portion of the gain control circuit in accordance with the value of the armature current.

The gain control circuit 27 may be regarded as a voltage divider comprising a fixed resistance 32 and a variable resistance formed by the parallel connected shunt paths 34 extending to ground from the common conductor 33. Input error signal voltages are supplied from the radar receiver 16 to the fixed resistance 32. Output voltages are produced on the common conductor 33 between the fixed and variable resistances. If the value of the variable resistance is made to equal the reciprocal of the bias control voltage from the differential amplifier, and if the control voltage and fixed resistance are large compared with the error signal voltage and the variable resistance respectively, it may be shown that the output voltage is proportional to the quotient of the input error signal divided by the bias control voltage. As the bias control voltage from the differential amplifier 26 is increased, the bias on the successive diodes in the parallel shunt paths is overcome, thus adding further resistance in parallel and decreasing the over-all value of the variable resistance. By proper selection of the values of the various resistances and of the diode bias values, the over-all resistance of the circuit may be made to approximate the reciprocal of the bias control voltage very closely.

Figure 2:
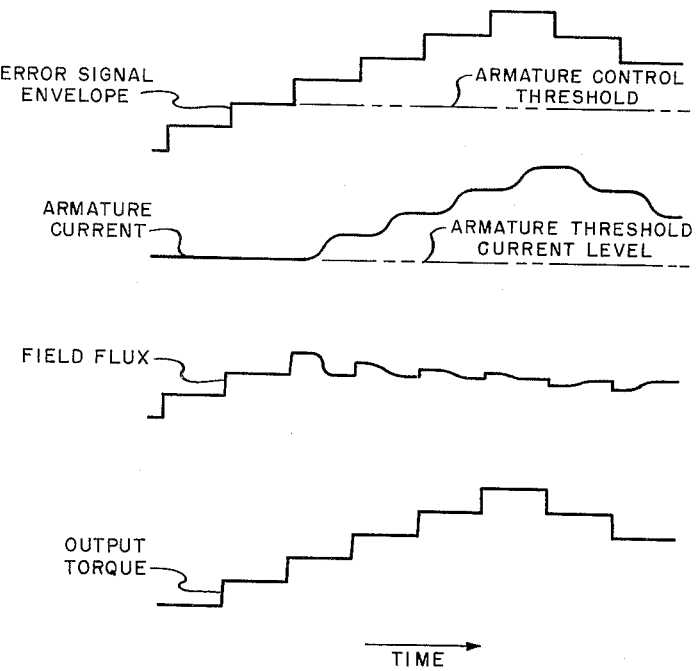
FIG. 2 is a series of graphs depicting the time sequence of events which occur in the embodiment of FIG. 1.

The cooperation of the various elements in the embodiment just discussed may be seen by reference to FIG. 2. Here in time related sequence, the relative amplitudes of the envelope of the error signal voltage, the armature current, the field flux and the torque output are shown. The error signal voltage of course will vary according to the target deviation from the antenna line of sight or according to the particular conditions experienced by the system in which this motor control is placed. For demonstration purposes the error signal is shown as sharply increasing by equal amounts after equal time intervals. The first increases in error signal control field current only. After the armature control threshold is reached both the field and armature currents are controlled. It can be seen that because of the slow armature response the armature current does not reach its proper value until an appreciable time after the error signal has been applied. The field flux however, rises almost as fast as the error signal to produce an output torque which is proportional to it and which is consequently proportional to the error signal. As the armature current increases with time, its value being divided into the gain of the field control channel causes the field flux to decrease accordingly, but results in the torque output remaining constant. This is because while the field flux is multiplied in the motor by the armature current, it is also divided by the armature current in the field control channel. Therefore the torque output will remain constant independently of changes in armature current.

It is also to be noticed that as the error signal increases according to higher torque requirements, even smaller changes in the field flux occur to produce the required torque. Thus, the danger of saturation of the field circuits even at very high error signal levels, is minimized.

For certain applications it may be desired to produce a torque output which while being generally linearly related to the value of the error signal voltage, does not respond as suddenly as in the first embodiment. Yet it may be desired that the motor have a response greater than that obtained with armature control alone and it may be desired that this response be controllable. A system providing these characteristics is shown in FIG. 3. Here in block diagram is an open loop system similar to that shown in the first embodiment. The essential distinction in the present system is that the motor response instead of being detected as a change in the armature current is measured as the torque output of the motor. This is done by means of a torque meter 50 which produces a voltage proportional to the output torque. This voltage passes through an amplifying means 51 and a variable time delay 52 and is then used to divide the control signal input in the field control channel.

Because the torque signal feedback to the gain control unit in the field channel is a function of both the armature current and field flux, the field control during the transience, i.e., while the armature current is changing, will be non-linear. However, for any particular value of control signal input during a quiescent state, the armature current will be linearly proportional to it. Furthermore, by control of the time delay the response of the motor to variations in the error signal may be controlled at will without affecting the ultimate linearity of the device.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A motor control system comprising a motor having separately excitable field and armature windings, a source of control signal voltages, means for supplying current to excite the armature winding of said motor to an amplitude in accordance with said control signal voltages, means for supplying current to excite the field windings of said motor to an amplitude and in a direction according to said control signal voltage, means for generating a bias control voltage proportional to the instantaneous value of current in said armature winding, amplitude control means integral with said field current supply means and having a control characteristic proportional to the reciprocal of an applied bias control voltage, said amplitude control means including a variable impedance shunt in said field supply means, and means for applying said bias control voltage to said amplitude control means.

2. The system defined in claim 1 wherein said variable impedance shunt comprises a branched network including a plurality of parallel connected shunt paths, each of said paths being electrically conductive above discrete values of bias control voltage, means for combining said bias control voltage and the control signal voltage and means for applying the combined voltage to said branches.

3. A motor control system comprising a motor having field windings and an armature winding, saturable core reactor amplifying means coupled with said armature winding for supplying current to excite said winding, a source of control signal voltage, means for controlling the magnitude of the output current of said armature amplifying means in accordance with the magnitude of said control signal voltage, field amplifying means for supplying current to said field windings, means for controlling the magnitude of the output current of said field amplifying means in accordance with said control signal voltage, and means for further controlling the magnitude of the output current of said field amplifying means by a factor proportional to the reciprocal of the instantaneous value of current in said armature winding.

4. A motor control system comprising a motor having field windings and an armature winding, magnetic saturable core reactor amplifying means coupled with said armature winding for supplying current to excite said armature winding, further amplifying means coupled with said field windings for supplying current to said field windings, means for controlling the magnitude of current exciting said armature winding in accordance with a control signal, means for controlling the magnitude and direction of magnetic flux developed by the excitement of said field windings in accordance with said control signal, means for simultaneously applying a control signal to each of said amplifying means, and means for further controlling the magnitude of magnetic flux developed by the excitement of said field windings inversely to the instantaneous magnitude of armature current.

5. A control device for a motor having separately excited field and armature windings, said device comprising first and second means for supplying a steady direct current to excite said armature and field windings respectively in response to a given applied control signal, means for simultaneously applying all input control signals to each of said first and second means, means for developing a bias control voltage indicative of the response of said motor and means for degeneratively controlling the magnitude of current produced by said second means in response to said bias control voltage.

6. A control device for a motor having separately excited field and armature windings, said device comprising first and second means for supplying current to excite said armature and field windings respectively in response to an applied control signal, means for simultaneously applying a control signal to each of said first and second means, means for developing a signal exclusively related to the magnitude of armature current in said motor and means for changing the magnitude of field current by a factor proportional to the reciprocal of the instantaneous armature current.

7. A direct current electric motor control system comprising an armature winding current supply means, a field winding current supply means, each of said current supply means being responsive to the magnitude of an applied control signal to regulate the current supplied to its respective winding, means for simultaneously applying a control signal to each of said current supply means, a resistor connected in series with the output of said armature winding current supply means, means for detecting the voltage differential across said resistor and means for reducing the amplification characteristics of said field winding current supply means by a factor proportional to the reciprocal of said detected voltage differential.

8. A control device for a motor having separately excited field and armature windings, said device comprising first and second means for supplying a steady direct current to excite said armature and field windings respectively in response to a given applied control signal, means for simultaneously applying all input control signals to each of said first and second means, means for producing a signal proportional to the instantaneous torque output of said motor, means for delaying said produced signal by an amount substantially equal to the overall signal response period of said armature winding current supply means and said armature winding whereby the delayed signal is related exclusively to the instantaneous magnitude of armature current and means for degeneratively controlling the magnitude of current produced by said second means in response to said delayed signal.

9. A motor control system comprising a motor having separately excitable field and armature windings, first and second means for supplying current to excite each of said windings respectively in accordance with a control signal, means for simultaneously applying a control signal to each of said first and second means, means for generating a bias voltage proportional in amplitude to the instantaneous value of current in said armature winding, amplitude control means integral with said first means and having an amplification characteristic proportional to the reciprocal of an applied bias voltage, and means for applying said bias voltage to said amplitude control means.

10. A control device for a motor having separately excited field and armature windings, said device comprising first and second means for supplying current to excite said armature and field winding respectively in response to an applied control signal, means for simultaneously applying a control signal to each of said first and second means, means for developing a bias control voltage representative of the response of the motor to a change in the control signal, and means for changing the magnitude of the field current by a factor proportional to the reciprocal of the bias control voltage.

References Cited by the Examiner

UNITED STATES PATENTS

| | | | |
|---|---|---|---|
| 1,926,821 | 9/33 | Stansbury | 318—432 X |
| 2,813,236 | 11/57 | Westfelt | 318—338 X |
| 3,054,937 | 9/62 | Long | 318—338 X |

ORIS L. RADER, *Primary Examiner.*

MILTON O. HIRSHFIELD, JOHN F. COUCH,
*Examiners.*